UNITED STATES PATENT OFFICE

STANLEY G. FLAGG, OF PHILADELPHIA, PENNSYLVANIA.

IMPROVEMENT IN CONVERTING CAST-IRON ARTICLES INTO STEEL.

Specification forming part of Letters Patent No. 162,047, dated April 13, 1875; application filed September 23, 1874.

*To all whom it may concern:*

Be it known that I, STANLEY G. FLAGG, of Philadelphia, Pennsylvania, have invented an Improvement in Converting Cast-Iron Articles into Steel, of which the following is a specification:

The object of my invention is to convert cast-iron objects into steel by subjecting them to heat while they are enveloped in a composition of charcoal, iron scale, or other suitable particles of iron, and sal-ammoniac, as described hereafter.

In carrying out my invention, care must be exercised in the selection of the cast-iron to suit the character of the steel object to be produced by conversion.

For a superior article of steel which has to be hardened, I prefer the Lake Superior charcoal-iron which has been melted in an air-furnace, as the latter has a tendency to refine the metal. For a softer and tough steel, not so easily hardened, the cast-iron may be melted in an ordinary cupola.

In preparing the composition, I prefer to use as one of the ingredients, on account of its economy, the iron scale of rolling-mills, although iron borings or turnings, or other comparatively small particles of iron, may be used for the purpose. As to the charcoal, that which has been used by distillers for rectifying purposes is cheap and available as an ingredient in the composition. The proportions of iron scale and charcoal may be about equal, while about one pound of sal-ammoniac may be added to every ten or fifteen pounds of the combined charcoal and scale.

These proportions may be varied considerably, in accordance with the quality of the cast-iron employed, and in accordance with the bulk of the object; the larger the casting to be converted the more sal-ammoniac is required.

The sal-ammoniac may be finely pulverized, in order to thoroughly mix it with the other ingredients; or the latter may be saturated with a strong solution of sal-ammoniac.

The castings to be converted are so packed in iron boxes with the composition that the latter shall envelop each casting; and after the boxes have been filled they are fitted with covers, which are made perfectly tight by a luting of loam or clay.

The boxes thus charged are placed in an ordinary heating-furnace, and there subjected to a nearly white heat for from forty-eight to sixty-nine hours, according to the size of the castings, after which the furnace is permitted to become cool, when the boxes may be withdrawn, and the articles, now converted into steel, may be removed.

I claim as my invention—

The process of converting cast-iron objects into steel by subjecting them to heat while they are enveloped in a composition of scales or other particles of iron, charcoal, and sal-ammoniac, as set forth.

In testimony whereof I have signed my name to this specification in the presence of two subscribing witnesses.

STANLEY G. FLAGG.

Witnesses:
 HARRY SMITH,
 HUBERT HOWSON.